United States Patent
Reuter et al.

(10) Patent No.: US 8,356,474 B2
(45) Date of Patent: Jan. 22, 2013

(54) LNT DESULFATION STRATEGY WITH REFORMER TEMPERATURE MANAGEMENT

(75) Inventors: Johannes Walter Reuter, Allensbach (DE); James Edward McCarthy, Jr., Canton, MI (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 196 days.

(21) Appl. No.: 12/697,797

(22) Filed: Feb. 1, 2010

(65) Prior Publication Data

US 2010/0132635 A1 Jun. 3, 2010

Related U.S. Application Data

(62) Division of application No. 11/293,065, filed on Dec. 2, 2005, now Pat. No. 7,669,408.

(51) Int. Cl.
*F01N 3/00* (2006.01)

(52) U.S. Cl. .............................. 60/295; 60/301; 60/303

(58) Field of Classification Search ............... 60/274, 60/276, 286, 295, 297, 303; 123/1 A, 3, 123/DIG. 12; 48/61, 197 R, 198.3, 198.7, 48/198.8

See application file for complete search history.

(56) References Cited

U.S. PATENT DOCUMENTS

| | | | |
|---|---|---|---|
| 5,974,788 A | 11/1999 | Hepburn et al. | |
| 6,164,064 A | 12/2000 | Pott | |
| 6,202,407 B1 | 3/2001 | Brusasco et al. | |
| 6,244,044 B1* | 6/2001 | Bartley | 60/274 |
| 6,508,057 B1 | 1/2003 | Bouchez et al. | |
| 6,557,342 B2* | 5/2003 | Suga et al. | 60/301 |
| 6,560,958 B1 | 5/2003 | Bromberg et al. | |
| 6,708,484 B2* | 3/2004 | Onodera et al. | 60/286 |
| 6,732,507 B1 | 5/2004 | Stanglmaier et al. | |
| 6,745,560 B2 | 6/2004 | Storia et al. | |
| 6,823,662 B1* | 11/2004 | Yamamoto et al. | 60/286 |
| 6,832,473 B2 | 12/2004 | Kupe et al. | |
| 7,082,753 B2 | 8/2006 | Dalla Betta et al. | |
| 7,134,272 B2* | 11/2006 | Niwa et al. | 60/285 |
| 7,165,393 B2* | 1/2007 | Betta et al. | 60/286 |
| 2004/0050035 A1* | 3/2004 | Smaling | 60/285 |
| 2004/0076565 A1 | 4/2004 | Ganghi et al. | |
| 2004/0103651 A1* | 6/2004 | Bennett et al. | 60/286 |
| 2005/0076635 A1 | 4/2005 | Suyama et al. | |
| 2005/0217254 A1 | 10/2005 | Uchida et al. | |

* cited by examiner

*Primary Examiner* — Thomas E. Denion
*Assistant Examiner* — Patrick Maines
(74) *Attorney, Agent, or Firm* — Paul V. Keller

(57) ABSTRACT

Desulfation methods for an exhaust treatment system having a fuel reformer configured upstream of a LNT. Reductant is injected upstream of the fuel reformer. The reductant reacts within the reformer to generate heat, but the system is configured for some reductant to breakthrough and react in the LNT to generate further heat. This configuration allows the LNT to operate at temperatures higher the than first device and facilitates independent control of the LNT and first device temperatures.

9 Claims, 5 Drawing Sheets

LNT DESULFATION STRATEGY WITH REFORMER TEMPERATURE MANAGEMENT

PRIORITY

This application is a divisional of U.S. application Ser. No. 11/293,065, filed Dec. 2, 2005.

FIELD OF THE INVENTION

The present invention relates to pollution control systems and methods for diesel and lean burn gasoline engines.

BACKGROUND $NO_x$ emissions from diesel engines are an environmental problem. Several countries, including the United States, have long had regulations pending that will limit $NO_x$ emissions from trucks and other diesel-powered vehicles. Manufacturers and researchers have put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling NOx emissions from diesel-powered vehicles. One set of approaches focuses on the engine. Techniques such as exhaust gas recirculation and partially homogenizing fuel-air mixtures are helpful, but these techniques alone will not eliminate NOx emissions. Another set of approaches remove NOx from the vehicle exhaust. These include the use of lean-burn $NO_x$ catalysts, selective catalytic reduction (SCR), and lean $NO_x$ traps (LNTs).

Lean-burn NOx catalysts promote the reduction of $NO_x$ under oxygen-rich conditions. Reduction of NOx in an oxidizing atmosphere is difficult. It has proven challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean-burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiencies for lean-burn catalysts are unacceptably low.

SCR generally refers to selective catalytic reduction of NOx by ammonia. The reaction takes place even in an oxidizing environment. The NOx can be temporarily stored in an absorbent or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

LNTs are devices with NOx absorbents and catalysts that reduce NOx during regeneration. The absorbent is typically an alkaline earth oxide absorbent, such as $BaCO_3$ and the catalyst is typically a precious metal, such as Pt or Ru. In lean exhaust, the catalyst speeds oxidizing reactions that lead to NOx adsorption. Accumulated NOx is removed and the LNT is regenerated by creating a reducing environment within the LNT. In a reducing environment, the catalyst activates reactions by which adsorbed NOx is reduced and desorbed.

A LNT can produce ammonia during denitration. Accordingly, it has been proposed to combine a LNT and an ammonia SCR catalyst into one system. Ammonia produced by the LNT during regeneration is captured by the SCR catalyst for subsequent use in reducing NOx, thereby improving conversion efficiency over a stand-alone LNT with no increase in fuel penalty or precious metal usage. U.S. Pat. No. 6,732,507 describes such a system. U.S. Pat. Pub. No. 2004/0076565 describes such systems wherein both components are contained within a single shell or disbursed over one substrate. WO 2004/090296 describes such a system wherein there is an inline reformer upstream of the LNT and the SCR catalyst.

Creating a reducing environment for LNT regeneration involves eliminating most of the oxygen from the exhaust and providing a reducing agent. Except where the engine can be run stoichiometric or rich, a portion of the reductant reacts within the exhaust to consume oxygen. The amount of oxygen to be removed by reaction with reductant can be reduced in various ways. If the engine is equipped with an intake air throttle, the throttle can be used. The transmission gear ratio can be changed to shift the engine to an operating point that produces equal power but contains less oxygen. However, at least in the case of a diesel engine, it is generally necessary to eliminate some of the oxygen in the exhaust by combustion or reforming reactions with reductant that is injected into the exhaust.

Reductant can be injected into the exhaust by the engine or a separate fuel injection device. For example, the engine can inject extra fuel into the exhaust within one or more cylinders prior to expelling the exhaust. Alternatively, or in addition, reductant can be injected into the exhaust downstream of the engine.

The reactions between reductant and oxygen can take place in the LNT, although it is generally preferred for the reactions to occur in a catalyst upstream of the LNT, whereby the heat of reaction does not cause large temperature increase within the LNT at every regeneration.

In addition to accumulating NOx, LNTs accumulate SOx. SOx is the combustion product of sulfur present in ordinarily fuel. Even with reduced sulfur fuels, the amount of SOx produced by combustion is significant. SOx adsorbs more strongly than NOx and necessitates a more stringent, though less frequent, regeneration. Desulfation requires elevated temperatures as well as a reducing atmosphere. The temperature of the exhaust can be elevated by engine measures, particularly in the case of a lean-burn gasoline engine, however, at least in the case of a diesel engine, it is often necessary to provide additional heat. Typically, this heat is provided through the same types of reactions as used to remove excess oxygen from the exhaust.

U.S. Pat. No. 6,832,473 describes a system wherein the reductant is reformate produced outside the exhaust stream and injected into the exhaust as needed. During desulfations, the reformate is injected upstream of an oxidation catalyst. Heat generated by combustion of the reformate over the oxidation catalyst is carried by the exhaust to the LNT and raises the LNT to desulfations temperatures.

U.S. Pat. Pub. No. 2003/0101713 describes an exhaust treatment system with a fuel reformer placed in the exhaust line upstream of a LNT. The reformer includes both oxidation and reforming catalysts. The reformer both removes excess oxygen and converts the diesel fuel reductant into more reactive reformate. For desulfations, heat produced by the reformer is used to raise the LNT to desulfations temperatures. The diesel fuel injection may be pulsed to control the reformer temperature.

In spite of advances, there continues to be a long felt need for an affordable and reliable exhaust treatment system that is durable, has a manageable operating cost (including fuel penalty), and is practical for reducing NOx emissions from diesel engines to a satisfactory extent in the sense of meeting U.S. Environmental Protection Agency (EPA) regulations effective in 2010 and other such regulations.

SUMMARY

Several of the inventors' concepts relates to methods of desulfating a LNT. The methods generally apply to a system in which a first device, which may be a fuel reformer, is placed upstream of the LNT in an exhaust treatment system. Reductant is injected upstream of the first device. Much of the reductant is oxidized and/or reformed in the first device and generates heat there.

According to one of the inventors' concepts for desulfating a LNT, a significant additional portion of the reductant and/or reformed products thereof react within the LNT to generate further heat. Typically, the LNT temperature is thereby raised to a peak that is at least about 100° C. higher than the temperature of the exhaust entering the LNT. This concept allows the LNT to operate at higher temperatures than the first device and facilitates independent control of the LNT and first device temperatures in conjunction with methods described below.

Another concept relates to a control strategy that applies to the above-described system. An outer loop controls the LNT temperature by issuing instructions to an inner loop that controls the first device. The instructions involve, for example, switching modes for the inner loop (e.g., between on and off modes). The inner loop controls the first device temperature through control at least over the reductant injection rate. Typically, the inner loop will pulse the reductant injection rate in order to limit the first device temperature. The outer loop can pulse the operation of the inner loop to independently control the temperature of the LNT.

A similar concept also relates to a method of desulfating a LNT in an exhaust aftertreatment system comprising a first device upstream of the LNT. The method comprises controlling a temperature of the LNT to within a first range by varying a supply of diesel fuel to the exhaust upstream of the first device. The control strategy comprising two modes of diesel fuel supply, a first mode of which comprises supplying diesel fuel in a manner that regulates the temperature of the first catalyst to within a second range having a minimum and a maximum, and a second mode in which the diesel fuel supply is substantially terminated, whereby the temperature of the first device falls below the minimum of the second range.

A further concept relates to a control strategy for desulfation that involves reductant injection that is intermittent on two time scales, one shorter and one longer. The intermittency on the longer time scale is generally used to control the temperature of an LNT. The intermittency on the shorter time scale is generally used to control the temperature of an upstream device, the first device referred to above, which is typically a fuel reformer.

A still further concept also relates to a desulfation control strategy for an exhaust treatment system having a first device upstream of a LNT and a reductant supply upstream of the first device. According to this strategy, the reductant supply is pulsed to control the temperature of the LNT. The pulse periods and durations are selected whereby reductant is provided to the LNT while the LNT temperature is still near a peak resulting from combustion of reductant injected during the previous pulse. A portion of the reductant, pyrolyzed, or reformed products thereof, maybe stored in the LNT during periods or reductant injection and may combust during periods of no reductant injection when the oxygen concentration within the LNT increases. If the LNT temperature varies over each pulse period between a minimum and a maximum differing by at least about 50° C., the LNT temperature will generally be within about 25° C. of the maximum at the onset of reductant injection.

The inventors' concepts include power generation systems and vehicles configured to implement one of the methods described herein.

The primary purpose of this summary has been to present certain of the inventors' concepts in a simplified form to facilitate understanding of the more detailed description that follows. This summary is not a comprehensive description of every one of the inventors' concepts or every combination of the inventors concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

DETAILED DESCRIPTION

Various concepts of the inventors are applicable to exhaust treatment systems having a first device upstream of a LNT. The first device comprises a catalyst that is operative to consume a substantial portion of the oxygen contained in the exhaust by reaction with a reductant added to the exhaust. A measurable amount of oxygen will always be present in the exhaust downstream of such a device, but in general the device will be adapted to remove most of the oxygen from the exhaust.

Preferably the first device is operative to produce reformate from a fossil fuel reductant, such as diesel fuel, but the concepts of the inventors are not so limited. For example, the various concepts can be applied to a system in which reformate is produced outside the exhaust line and is injected upstream of a first device, which operates simply as an oxidation catalyst.

Figure 1:
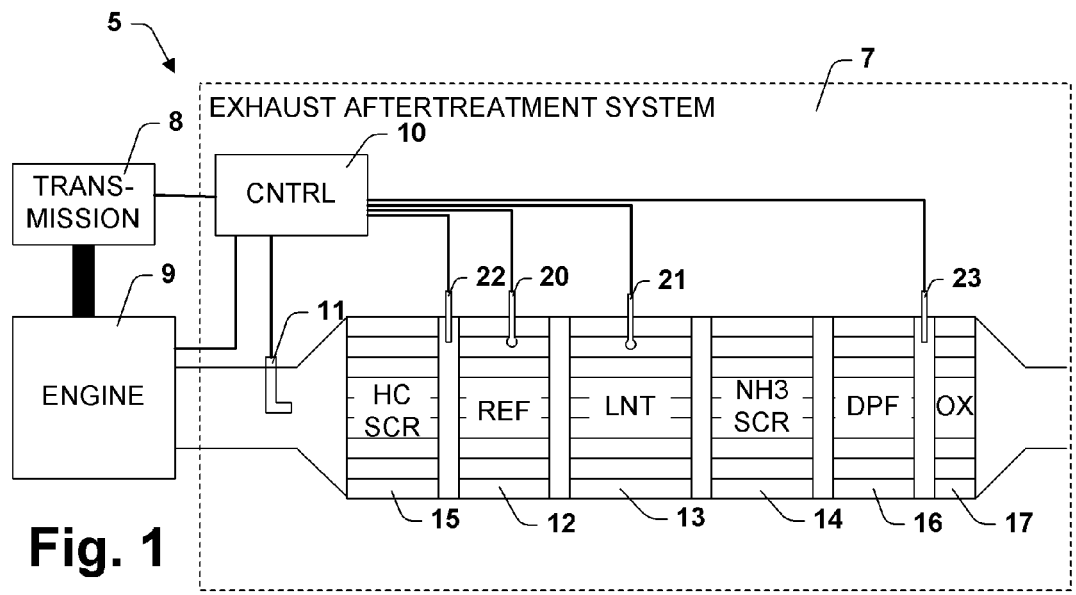
FIG. 1 is a schematic illustration of an exemplary exhaust treatment system in which several concepts of the inventors can be implemented.

FIG. 1 provides a schematic illustration of an exemplary power generation system 5 in which various concepts of the inventors can be implemented. The system 5 comprises an engine 9, a transmission 8, and an exhaust aftertreatment system 7. The exhaust aftertreatment system 7 includes a controller 10, a fuel injector 11, a lean NOx catalyst 15, a reformer 12, a lean NOx-trap (LNT) 13, an ammonia-SCR catalyst 14, a diesel particulate filter (DPF) 16, and a clean-up catalyst 17. The controller 10 receives data from several sources; include temperature sensors 20 and 21 and NOx sensors 22 and 23. The controller 10 may be an engine control unit (ECU) that also controls the transmission 8 and the exhaust aftertreatment system 7 or may include several control units that collectively perform these functions.

The transmission 8 can be of any type. In some embodiments, however, the transmission 8 is of a type that allows selection from among a large number of widely ranging torque multipliers and makes available a range of operating points at which the engine 9 can meet a given power demand. For example, the transmission 8 can be a continuously variable transmission (CVT).

The lean-NOx catalyst 15 removes a portion of the NOx from the engine exhaust using reductants, typically hydrocarbons that form part of the exhaust or have been stored by the lean-NOx catalyst 15. The DPF 16 removes particulates from the exhaust. During lean operation (a lean phase), the LNT 13 adsorbs a second portion of the NOx. The ammonia-SCR catalyst 14 may have ammonia stored from a previous regeneration of the LNT 13 (a rich phase). If the ammonia-SCR catalyst 14 contains stored ammonia, it removes a third portion of the NOx from the lean exhaust. The clean-up catalyst 17 may serve to oxidize CO and unburned hydrocarbons remaining in the exhaust.

From time-to-time, the LNT 13 must be regenerated to remove accumulated NOx (denitrated). Denitration may involve heating the reformer 12 to an operational temperature and then injecting fuel using the fuel injector 11. The reformer 12 uses the injected fuel to consume most of the oxygen from the exhaust while producing reformate. The reformate thus produced reduces NOx adsorbed in the LNT 13. Some of this NOx is reduced to $NH_3$, most of which is captured by the ammonia-SCR catalyst 14 and used to reduce NOx during a subsequent lean phase. The clean-up catalyst 17 oxidizes unused reductants and unadsorbed $NH_3$ using stored oxygen or residual oxygen remaining in the exhaust during the rich phases. During regeneration, the lean-NOx catalyst 15 may store reductant for later use.

Figure 2:
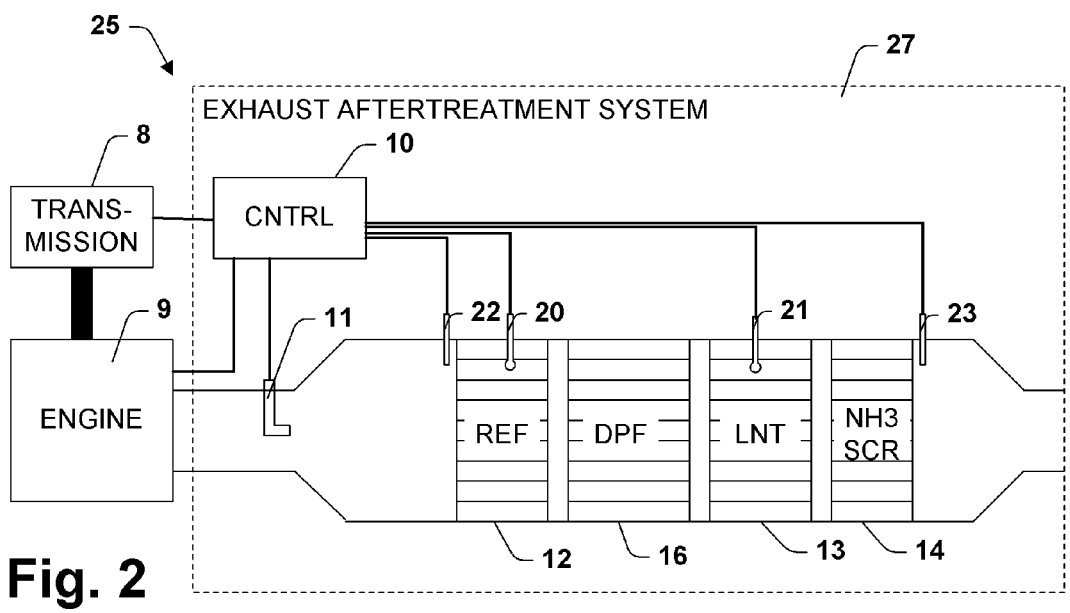
FIG. 2 is a schematic illustration of another exemplary exhaust treatment system in which several concepts of the inventors can be implemented.

FIG. 2 provides another exemplary system 25 to which various concepts of the invention can be applied. The system 25 contains many of the same components as the system 5, although it does not include the lean NOx catalyst 15 or the cleanup oxidation catalyst 17. One significant difference is that in the system 25 the DPF 14 is placed between the reformer 12 and the LNT 13. This configuration may facilitate timing the LNT temperature peaks to nearly coincide with the periods of reductant injection, as explained further below. The DPF 14 may also serve to protect the LNT 13 from high temperatures during denitrations by providing a thermal buffer between the reformer 12 and the LNT 13. Reducing the number and/or magnitude of temperature excursions in the LNT 14 may extend the life of the LNT 14.

From time-to-time, the LNT 13 must also be regenerated to remove accumulated sulfur compounds (desulfated). Desulfation may involve heating the reformer 12 to an operational temperature, heating the LNT 13 to a desulfating temperature, and providing the heated LNT 13 with a reducing atmosphere. An operational temperature for the reformer depends on the reformer design. Desulfating temperatures also vary, but are typically in the range from about 500 to about 800° C., more typically in the range from about 650 to about 750° C. Below a minimum temperature, desulfation is very slow. Above a maximum temperature, the LNT 13 may be damaged.

One concept relates to a method of achieving or maintaining desulfation temperatures in the LNT 13. According to this method the LNT 13 is heated by measures that include injecting reductant into the exhaust. A portion of the reductant reacts in the reformer 12, or an oxidation catalyst, to generate heat for raising the temperature of the LNT 13, but an additional portion of the reductant, or derivatives thereof, passes through the reformer 12 or oxidation catalyst and react in the LNT 13. The reactions in the LNT 13 generate a significant amount of heat there. One advantage of this method is that the temperatures of the LNT 13 and the reformer 12 can be independently controlled. Another advantage is that the reformer 12 does not have to be heated to the degree required if the LNT 13 is heated purely by convective heat transfer from the reformer 12. This latter advantage may be particularly significant if there is a substantial heat loss to the surroundings between the reformer 12 and the LNT 13. The latter advantage may also be significant if there is an optimal temperature for operating the reformer 12 that is not conveniently related to the optimal temperature for desulfating the LNT 13.

The reductant supply to the reformer 12 is typically intermittent. This can facilitate providing reagents for combustion in the LNT 13. For example, during a reductant injection phase, the exhaust is generally made rich and oxygen concentration may be brought very low as the exhaust passes through the reformer 12. Nevertheless, there may be oxidation in the LNT 13 using oxygen stored there in a previous phase of no reductant injection or using oxygen that accumulates in the space between the reformer 12 and the LNT 13 if that space is sufficiently large. Another possibility is that the oxygen is oxygen slipping past the reformer 12 during the reductant injection phase. Such slippage may be facilitated by low temperature operation of the reformer 12, limited catalyst loading, or limited mass transfer efficiency between the exhaust and that catalyst.

It is also possible that combustion within the LNT 13 takes place during phase of no reductant injection when oxygen concentration in the exhaust is high. Such combustion can be realized if reductant, such as hydrocarbon, pyrolyzed reductant, or reformed reductant is adsorbed in the LNT 13 during the reductant injection phases. Another possibility is that one of these species accumulates in the space between the reformer 12 and the LNT 13 during a reductant injection phase and mixes with oxygen during a subsequent phase of no reductant injection. In one embodiment, the manner of supplying fuel to the LNT 13 for combustion in the LNT 13 is to allow a diesel fuel reductant or pyrolyzed compounds derived from that reductant (cracked diesel fuel) to slip past the first device. Slip can be controlled through the activity and mass transfer characteristic of the first device, the diesel fuel injection rate, and or the temperature to which the reformer 12 is controlled. The LNT 13 generally contains a catalyst functional with respect to combustion of most reductants.

One measure of the extent to which the LNT 13 is heated by reactions occurring therein is a comparison between the peak temperature of the exhaust entering the LNT 13 during a desulfation process and the peak temperature realized within the LNT 13 during that process. Preferably, through any suitable combination of measures, reactions are brought about in the LNT 13 that are sufficient to raise a temperature within the LNT 13 to a peak at least about 50° C. higher than the peak temperature of the exhaust entering the LNT 13. More preferably the difference is at least about 100° C. and still more preferably at least about 150° C.

A related concept is a control system comprising inner and outer loops. The outer loop controls the LNT temperature by issuing instructions to an inner loop. The inner loop controls the first device temperature (typically a reformer) through control over the reductant injection rate and possibly other measures as well. Other measures could include, for example, an intake air throttle for the engine 9 or a torque ratio selection for the transmission 8. One advantage of this configuration is that the inner loop generally has faster dynamic than the outer loop and can rapidly respond to disturbances that affect the exhaust flow rate, temperature, or composition.

Figure 3:
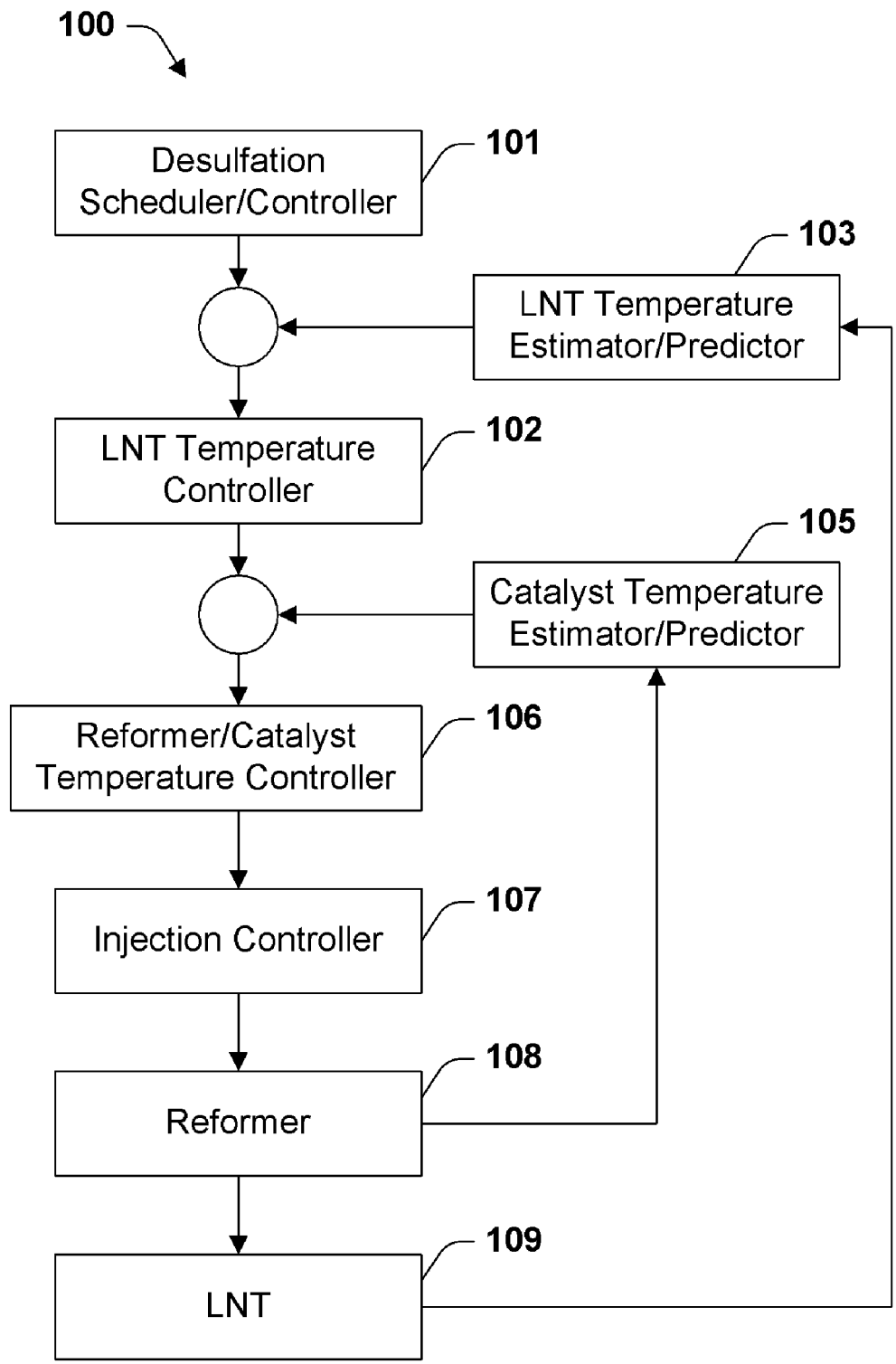
FIG. 3 is a schematic of a control architecture exemplifying one of the inventors' concepts.

FIG. 3 provides a schematic of an exemplary control architecture 100 illustrating inner and outer loop controls. The LNT temperature controller 102 is activated by a desulfation scheduler/controller 101 that applies any appropriate criteria to determine to when initiate a desulfation process. The LNT temperature controller 102 considers a LNT temperature provided by a state estimator 103. It is preferred to use an observer or state estimator to determine the LNT temperature, because the LNT temperature responds comparatively slowly to controllable parameters. If some form of prediction is not used, there is a risk of the LNT temperature exceeding an intended limit. An extrapolation based on the current measured temperature, its rate of change, and an estimate of the temperature measurement delay is generally sufficient.

The output of the LNT temperature controller is instructions for the reformer temperature controller 106. The instructions may simply be instructions for the reformer 12 to switch between active and inactive modes. During the active mode, the reformer 12 is controlled to a temperature suitable for reformate production. During an inactive mode, the reformer 12 is generally "off", meaning there is no reductant injection and the reformer 12 is allowed to cool freely.

When the reformer 12 is to be active, the reformer temperature controller 106 regulates the reformer temperature at least by issuing commands to the injection controller 107. There are various types of reformers, as described below, and various configurations within each type.

During rich operation of the reformer 12, the majority of the oxygen present in the exhaust is consumed while producing reformate. Regardless of the actual sequence of reactions, the operation of the reformer 12 can be modeled by a combination of reactions similar to the following:

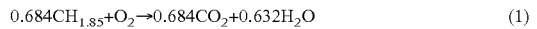

$$0.684CH_{1.85} + O_2 \rightarrow 0.684CO_2 + 0.632H_2O \quad (1)$$

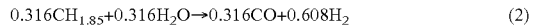

$$0.316CH_{1.85} + 0.316H_2O \rightarrow 0.316CO + 0.608H_2 \quad (2)$$

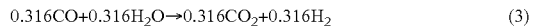

$$0.316CO + 0.316H_2O \rightarrow 0.316CO_2 + 0.316H_2 \quad (3)$$

wherein $CH_{1.85}$ represents an exemplary reductant, such as diesel fuel, with a 1.85 ratio between carbon and hydrogen. Equation (1) is exothermic complete combustion by which oxygen is consumed. Equation (2) is endothermic steam reforming. Equation (3) is the water gas shift reaction, which is comparatively thermal neutral and is not of great importance in the present disclosure, as both CO and $H_2$ are effective for regeneration.

In an ideal situation, the balance of Equations (1) and (2) provides just enough heat to maintain the reformer temperature. When the oxygen concentration is relatively high, e.g., 5-10% or more, depending on the reformer, there may be a tendency for reaction (1) to dominate whereby the reformer temperature increases to an undesirable degree. Eventually, the reformer 12 must be shutdown to prevent over heating. Once the reformer 12 has cooled, fuel injection can be restarted. The result is that the reformer controller 106 often causes the fuel supply rate to be pulsed in order to maintain the reformer temperature within an acceptable range, particularly when the exhaust oxygen concentration is comparatively high.

Figure 4:
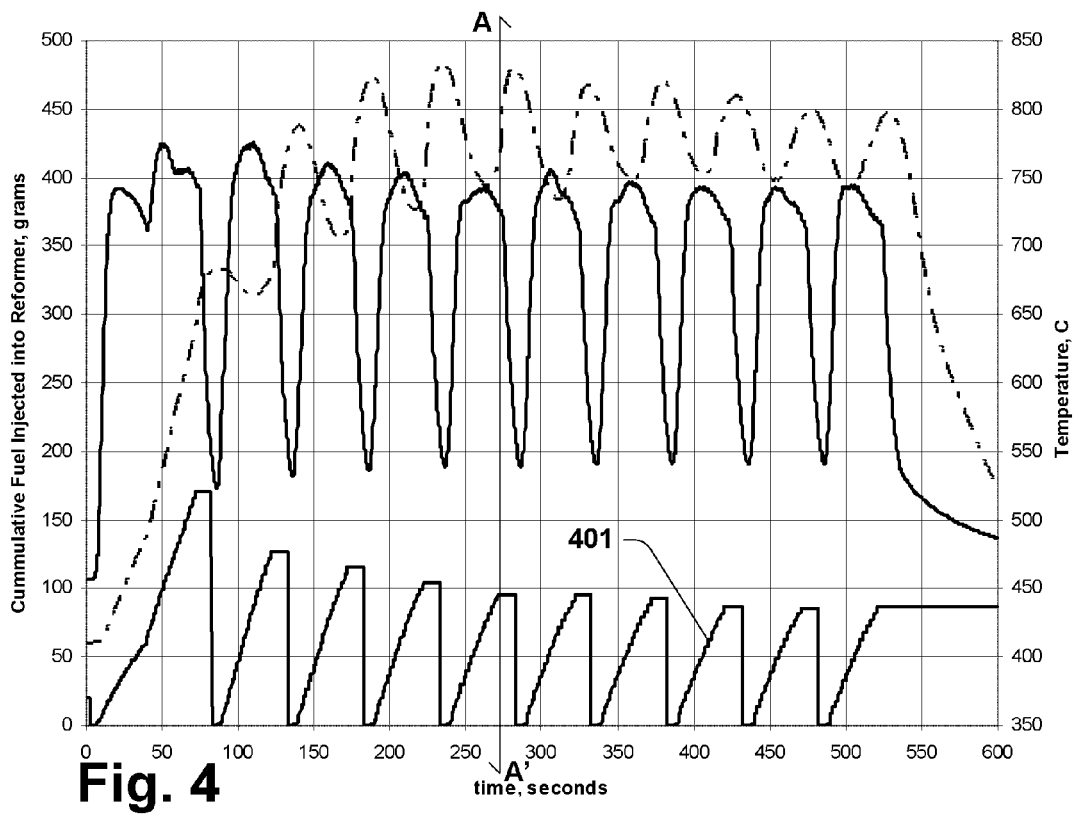
FIG. 4 is a plot showing an exemplary pattern of fuel injection and resulting reformer and LNT temperature profiles.

FIG. 4 illustrates a fuel supply pattern that results from an exemplary implementation of the above-described control strategy. Line 401 is a plot of total fuel injected—a quantity that would be monotonically increasing except that it is periodically reset to zero to allow plotting at a scale at which details of line 401 are comparatively visible. The fuel injection is relatively periodic on a longer time scale, being characterized by phases in which the total fuel injection increases in a staircase fashion and phases in which there is no fuel injection. During the phases where fuel is injected, the staircase pattern is indicative of pulsed fuel injection on a shorter time scale.

Line 402 of FIG. 4 is a plot of reformer temperatures resulting from the fuel injection pattern of line 401. Line 403 is a pot of resulting LNT temperatures. Pulsing on the longer time scale can control the LNT temperatures to within a target range for desulfating the LNT 13. Pulsing on the shorter time scale can control the reformer temperature to within a target temperature range for efficiently producing reformate without overheating the reformer 12. The lengths of the phases or periods of reductant injection or no reductant injection on the longer time scale are long compared to the corresponding phases or periods on the shorter time scale.

Accordingly, one of the inventors' concepts is supplying reductant to a first device upstream of an LNT at a rate that is intermittent on two time scales, one shorter and one longer. In this context, pulsing or intermittency should be understood as something that can be easily detected by a hypothetical measurement of the reductant concentration in the exhaust entering the first device and does not include very rapid pulsing that results in an essentially continuous supply of reductant to the first device. Specifically, pulsing in the present context does not include rapidly switching a valve between fully open and fully closed positions in order to control the flow rate through the valve.

The pulse periods on the shorter time scale are typically from about 0.05 to about 2 seconds, more typically about 0.1 to about 1 second. The pulse periods on the longer time scale are typically from about 3 to about 30 seconds. The pulse periods on the longer time scale are typically at least about 4 times longer than the pulse periods on the shorter time scale, more typically at least about 8 times as long, and still more typical at least about 12 times as long. These ratios also typically apply to the individual phases, e.g., the periods of no fuel injection on the longer time scale are typically at least about 4 times longer than the periods of no fuel injection on the shorter time scale.

As highlighted by the line A-A' in FIG. 4, the temperature in the LNT 13 continues to rise long (at least about 5 seconds in this example) after fuel injection ceases. While details are uncertain, the temperature rise is related to chemical reactions within the LNT 13. Heat transfer from the reformer 12 is not a sufficient explanation in that the temperatures to which the LNT 13 is rising are above those occurring in the reformer 12. While the inventors' concepts are not, in general, tied to any particular theory, it is believed that the continued temperature rise is at least in part the result of combustion of adsorbed reductant in the LNT 13, most likely hydrocarbons slipping from the reformer 12.

Figure 5:
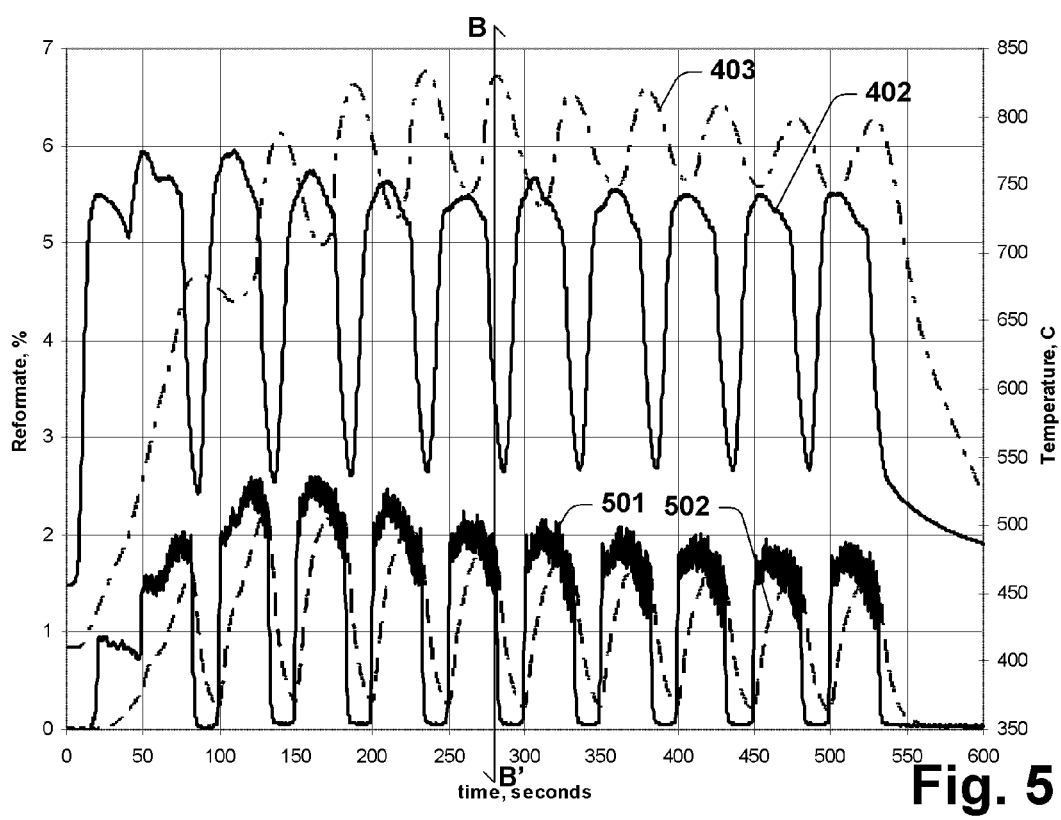
FIG. 5 is a plot showing exemplary temperatures and reformate concentrations in a LNT downstream of a reformer when fuel is supplied as shown in FIG. 4.

FIG. 5 illustrates a temporal relationship between temperatures and reductant concentrations within the LNT 13 that result from the fuel injection plotted in FIG. 4. Line 501 is a plot of hydrogen concentrations and line 502 is a plot of carbon monoxide concentrations. As highlighted by the line B-B', temperature peaks within the LNT 13 occur significantly later in time than the reformate production peaks. FIG. 5 is meant to illustrate the basis for a concept, rather than constitute a preferred embodiment. Preferably the subsequent reformate production peaks occurs sooner than shown or the LNT temperature peaks occur later than shown, whereby there is a coincidence between the LNT temperature peak and the reformate production peak for the subsequent period.

Figure 6:
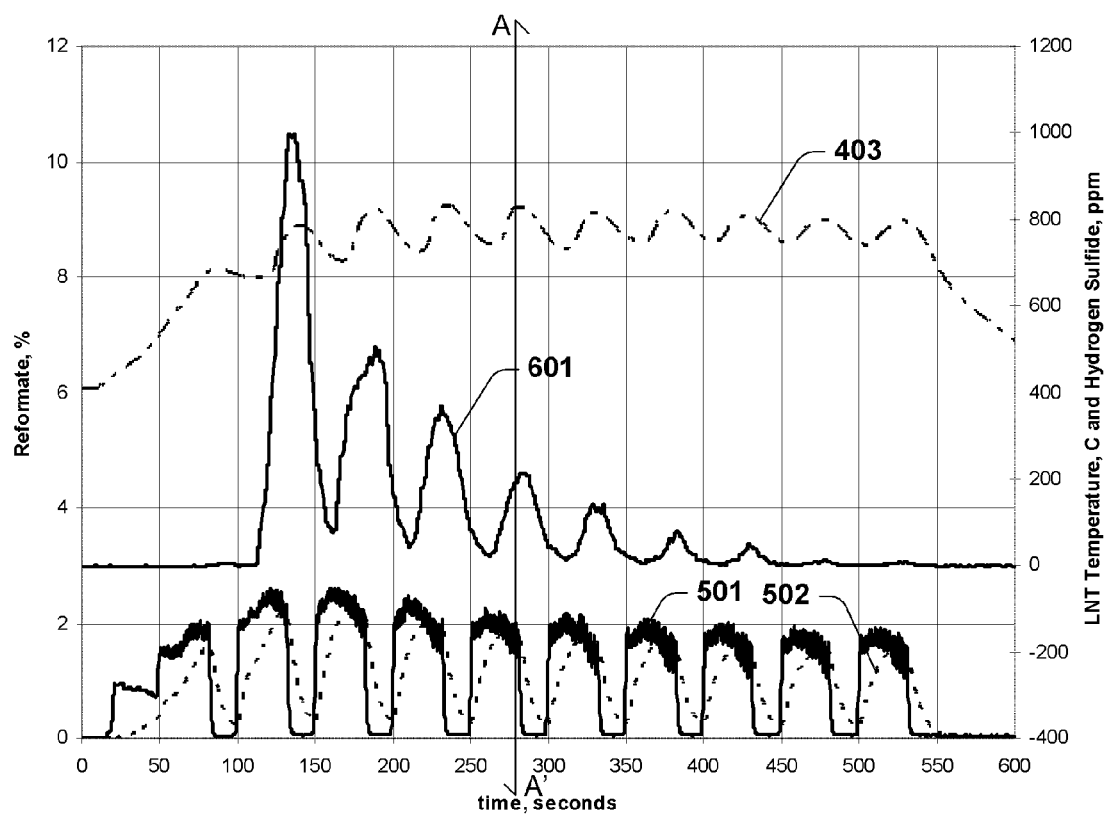
FIG. 6 is a plot showing the relationship between rates of desulfation and conditions plotted in FIG. 5.

FIG. 6 illustrates the relationship between desulfation rates and the conditions plotted in FIG. 5. Line 601 is a plot of hydrogen sulfide concentration downstream of the LNT 13. In this example, the great majority of the sulfur was released in the form of $H_2S$, whereby the $H_2S$ concentration reflects the desulfation rate. The desulfation rate is shown to be a strong function of temperature, even where the reformate concentration peaks do not coincide with the LNT temperature peaks. If the reformate concentrations peaks are caused to approach the LNT temperature peaks, the reformate will be more effectively used.

Another of the inventors' concepts is to time the periods between reductant injection phases whereby the peak LNT temperatures occur in the midst of or near the beginnings of reductant injection phases as opposed to near the ends of the reductant injection phases. The pulse periods and durations are selected whereby reductant is provided to the LNT 13 while the LNT temperature is still near a peak resulting from combustion of reductant injected during the previous pulse. For example, if the LNT temperature varies over each pulse period between a minimum and a maximum differing by at least about 50° C., the LNT temperature will generally be within about 25° C. of the maximum at the onsets of the reductant injection phases. If the LNT temperature varies over each pulse period between a minimum and a maximum differing by at least about 100° C., the LNT temperature will generally be within about 50° C. of the maximum at the onsets of the reductant injection phases.

Figure 7:
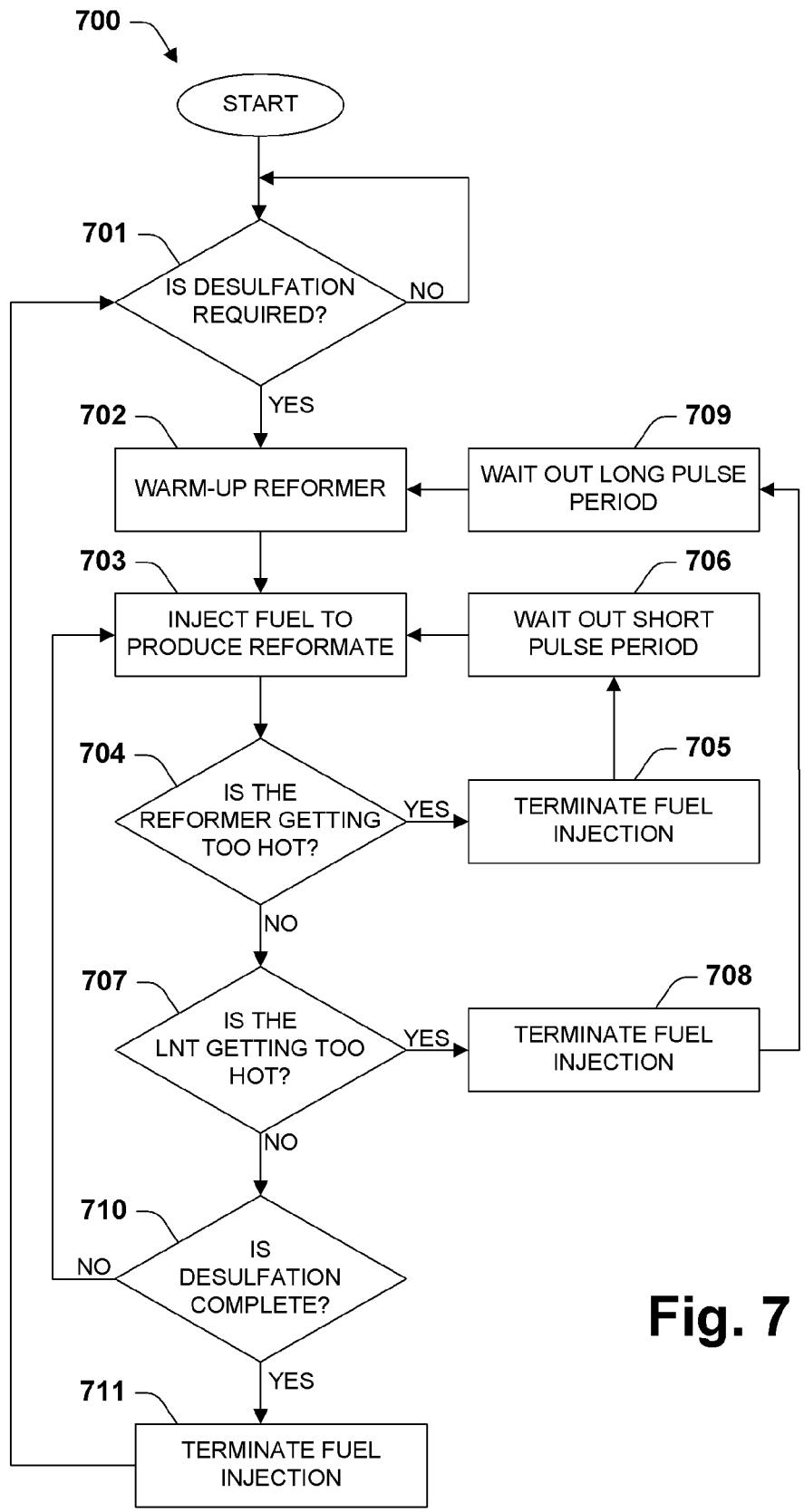
FIG. 7 is a flow chart of an exemplary control process that can be used in implementing several of the inventors' concepts.

This concept is most applicable when the temperature continues to rise significantly after the end of each reductant injection phase on the longer time scale. Preferably, the LNT temperature continues to rise for at least about 3 seconds after the end of each reductant injection phase, more preferably at least about 5 seconds. Preferably, the LNT temperature rises by at least about 40° C. after the end of each reductant injection phase FIG. 7 illustrates a control process 700 consistent with the control architecture shown in FIG. 3 and providing an exemplary implementation of several of the above-described concepts. The process 700 begins with operation 701, determining whether desulfation is required. The determination may be made in any suitable fashion. For example, desulfation may be scheduled periodically, e.g., after every 30 hours of operation. Alternatively, the need for desulfation can be determined based on system performance, e.g., based on the activity of the LNT 13 following an extensive denitration or based on the frequency with which denitration is required having increased to an excessive degree.

The denitration process begins with operation 702, warming the reformer 12. A typical reformer as contemplated herein is one that operates effectively only at temperatures above typical diesel engine exhaust temperatures. The reformer 12 can be heated in any suitable fashion. In this example, the reformer 12 is heated by injecting fuel at a rate that keeps the exhaust at or below a stoichiometric fuel to oxygen ratio. Substantially all the fuel thereby combusts in the reformer 12 to produce heat and there is essentially no reformate production.

The LNT 13 heats while the reformer 13 is heating, however, after the reformer 12 is fully heated, the LNT may still require further heating. If necessary, at or below stoichiometric operation may be extended to adequately heat the LNT 13. In one example, the LNT 13 is heated to a temperature of at least about 450° C. prior to commencing rich operation with hydrocarbon slip.

Once the warm-up phase is complete, operation 703 begins. The fuel injection rate at this stage is generally optimized to give a maximum ratio between reformate production and fuel expended. Where the controller 10 can throttle the engine air intake or select the transmission gear ratio, these control parameters can be selected to facilitate the efficient production and/or usage of the reformate.

Operation 704 determines whether the reformer 12 is overheating. Preferably, the reformer temperature for this purpose is a delay-free estimate. For example, such an estimate can be made with information from a temperature sensor in the reformer 12 or in the exhaust immediately downstream of the reformer 12. Forming the estimate can involve a simple extrapolation, or can be accomplished using an observer, such as a Kalman filter or a sliding mode observer. An observer preferably comprises a model that takes into account hydrocarbon adsorption in the reformer 12. It has been observed that hydrocarbon adsorption in the reformer 12 can cause the temperature of the reformer 12 to increase significantly after the fuel supply is shut off. The reformer temperature can also overshoot significantly due to the delay in receiving temperature measurements unless delay-free estimates are used.

When the reformer 12 is on the verge of overheating, operation 705 shuts off the fuel injection. In operation 706, the process 700 waits while the reformer 12 cools. The length of the waiting period can be determined in any suitable fashion. In one example, operation 706 lasts until the reformer 12 has cooled to a target temperature. In another example, there is a fixed period between each short time-scale fuel pulse. In a further example, the length of the period is selected dynamically by the controller as part of the process of optimizing the amount of reformate production per unit fuel injected. Steps 703-706 comprise the inner loop of the control process.

Operation 707 is part of the outer loop. Step 707 determines whether the LNT 13 is getting too hot. Again, a delay-free estimate is preferably used as the LNT 13 may heat considerably following the termination of fuel injection. If the LNT is getting too hot, operation 708 terminates the fuel injection. Terminating the fuel injection may comprise issuing instructions to the inner loop control.

Operation 709 is another waiting operation. In one example, this comprises waiting until the LNT 13 has cooled to a target temperature. Preferably, however, there is a fixed period between phases of active fuel injection on the longer time scale. Such a fixed period can be used to implement the above-described concept of timing these periods in order that the peak LNT temperature occurs in the midst of or near the beginning of the phases of active fuel injection.

Following operation 709, the reformer is heated again in operation 702. Operation 702, 707, 708, and 709 comprise the outer loop. If the reformer 12 is of the type that must be heated to operate effectively, heating is generally necessary following a period of no fuel injection on the longer time scale. The periods of no fuel injection on the shorter time scale are normally selected to avoid having to reheat the reformer 12. After the longer periods of no fuel injection on the longer time scale, the reformer 12 is generally too cool to effectively produce reformate without a heating period.

While the engine 9 is preferably a compression ignition diesel engine, the various concepts of the invention are applicable to power generation systems with lean-burn gasoline engines or any other type of engine that produces an oxygen rich, NOx-containing exhaust. For purposes of the present disclosure, NOx consists of NO and $NO_2$.

The transmission 8 can be any suitable type of automatic transmission. The transmission 8 can be a conventional transmission such as a counter-shaft type mechanical transmission, but is preferably a CVT. A CVT can provide a much larger selection of operating points than a conventional transmission and generally also provides a broader range of torque multipliers. In general, a CVT will also avoid or minimize interruptions in power transmission during shifting. Examples of CVT systems include hydrostatic transmissions; rolling contact traction drives; overrunning clutch designs; electrics; multispeed gear boxes with slipping clutches; and V-belt traction drives. A CVT may involve power splitting and may also include a multi-step transmission.

A preferred CVT provides a wide range of torque multiplication ratios, reduces the need for shifting in comparison to a conventional transmission, and subjects the CVT to only a fraction of the peak torque levels produced by the engine. This can be achieved using a step-down gear set to reduce the torque passing through the CVT. Torque from the CVT passes through a step-up gear set that restores the torque. The CVT is further protected by splitting the torque from the engine, and recombining the torque in a planetary gear set. The planetary gear set mixes or combines a direct torque element transmitted from the engine through a stepped automatic transmission with a torque element from a CVT, such as a band-type CVT. The combination provides an overall CVT in which only a portion of the torque passes through the band-type CVT.

The fuel injector 11 can be of any suitable type. Preferably, it provides the fuel in an atomized or vaporized spray. The fuel may be injected at the pressure provided by a fuel pump for the engine 9. Preferably, however, the fuel passes through a pressure intensifier operating on hydraulic principles to at least double the fuel pressure from that provided by the fuel pump to provide the fuel at a pressure of at least about 4 bar.

The lean-NOx catalyst 15 can be either an HC-SCR catalyst, a CO-SCR catalyst, or a $H_2$-SCR catalyst. Examples of HC-SCR catalysts include transitional metals loaded on refractory oxides or exchanged into zeolites. Examples of transition metals include copper, chromium, iron, cobalt, nickel, cadmium, silver, gold, iridium, platinum and manganese, and mixtures thereof. Exemplary of refractory oxides include alumina, zirconia, silica-alumina, and titania. Useful zeolites include ZSM-5, Y zeolites, Mordenite, and Ferrerite. Preferred zeolites have Si:Al ratios greater than about 5, optionally greater than about 20. Specific examples of zeolite-based HC-SCR catalysts include Cu-ZSM-5, Fe-ZSM-5, and Co-ZSM-5. A $CeO_2$ coating may reduce water and $SO_2$ deactivation of these catalysts. Cu/ZSM-5 is effective in the temperature range from about 300 to about 450° C. Specific examples of refractory oxide-based catalysts include alumina-supported silver. Two or more catalysts can be combined to extend the effective temperature window.

Where a hydrocarbon-storing function is desired, zeolites can be effective. U.S. Pat. No. 6,202,407 describes HC-SCR catalysts that have a hydrocarbon storing function. The catalysts are amphoteric metal oxides. The metal oxides are amphoteric in the sense of showing reactivity with both acids and bases. Specific examples include gamma-alumina, $Ga_2O_3$, and $ZrO_2$. Precious metals are optional. Where precious metals are used, the less expensive precious metals such as Cu, Ni, or Sn can be used instead of Pt, Pd, or Rh.

In the present disclosure, the term hydrocarbon is inclusive of all species consisting essentially of hydrogen and carbon atoms, however, a HC-SCR catalyst does not need to show activity with respect to every hydrocarbon molecule. For example, some HC-SCR catalysts will be better adapted to utilizing short-chain hydrocarbons and HC-SCR catalysts in general are not expected to show substantial activity with respect to $CH_4$.

Examples of CO-SCR catalysts include precious metals on refractory oxide supports. Specific examples include Rh on a $CeO_2$—$ZrO_2$ support and Cu and/or Fe $ZrO_2$ support.

Examples of $H_2$-SCR catalysts also include precious metals on refractory oxide supports. Specific examples include Pt supported on mixed $LaMnO_3$, $CeO_2$, and $MnO_2$, Pt supported on mixed $ZiO_2$ and $TiO_2$, Ru supported on MgO, and Ru supported on $Al_2O_3$.

The lean-NOx catalyst 15 can be positioned differently from illustrated in FIG. 1. In one embodiment, the lean NOx catalyst 15 is upstream of the fuel injector 11. In another embodiment the lean NOx catalyst is downstream of the reformer 12, whereby the lean NOx catalyst 15 can use reformer products as reductants. In a further embodiment, the lean NOx catalyst 15 is well downstream of the LNT 13, whereby the lean NOx catalyst 15 can be protected from high temperatures associated with desulfating the LNT 13.

A fuel reformer is a device that converts heavier fuels into lighter compounds without fully combusting the fuel. A fuel reformer can be a catalytic reformer or a plasma reformer. Preferably, the reformer 12 is a partial oxidation catalytic reformer. A partial oxidation catalytic reformer comprises a reformer catalyst. Examples of reformer catalysts include precious metals, such as Pt, Pd, or Ru, and oxides of Al, Mg, and Ni, the later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 500° C. A partial oxidation catalytic reformer is generally operative at temperatures from about 600 to about 1100° C.

The NOx absorber-catalyst 13 can comprise any suitable NOx-adsorbing material. Examples of NOx adsorbing materials include oxides, carbonates, and hydroxides of alkaline earth metals such as Mg, Ca, Sr, and Be or alkali metals such as K or Ce. Further examples of NOx-adsorbing materials include molecular sieves, such as zeolites, alumina, silica, and activated carbon. Still further examples include metal phosphates, such as phosphates of titanium and zirconium. Generally, the NOx-adsorbing material is an alkaline earth oxide. The absorbent is typically combined with a binder and either formed into a self-supporting structure or applied as a coating over an inert substrate.

The LNT 13 also comprises a catalyst for the reduction of NOx in a reducing environment. The catalyst can be, for example, one or more precious metals, such as Au, Ag, and Cu, group VIII metals, such as Pt, Pd, Ru, Ni, and Co, Cr, Mo, or K. A typical catalyst includes Pt and Rh, although it may be desirable to reduce or eliminate the Rh to favor the production of $NH_3$ over $N_2$. Precious metal catalysts also facilitate the absorbent function of alkaline earth oxide absorbers.

Absorbents and catalysts according to the present invention are generally adapted for use in vehicle exhaust systems. Vehicle exhaust systems create restriction on weight, dimensions, and durability. For example, a NOx absorbent bed for a vehicle exhaust systems must be reasonably resistant to degradation under the vibrations encountered during vehicle operation.

An absorbent bed or catalyst brick can have any suitable structure. Examples of suitable structures may include monoliths, packed beds, and layered screening. A packed bed is preferably formed into a cohesive mass by sintering the particles or adhering them with a binder. When the bed has an absorbent function, preferably any thick walls, large particles, or thick coatings have a macro-porous structure facilitating access to micro-pores where adsorption occurs. A macro-porous structure can be developed by forming the walls, particles, or coatings from small particles of adsorbant sintered together or held together with a binder.

The ammonia-SCR catalyst 14 is a catalyst effective to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substituted with metal ions such as cations of Cu, Co, Ag, Zn, or Pt, and activated carbon. Preferably, the ammonia-SCR catalyst 14 is designed to tolerate temperatures required to desulfate the LNT 13.

The particulate filter 16 can have any suitable structure. Examples of suitable structures include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers. Typical pore sizes for the filter elements are about 10 μm or less. Optionally, one or more of the reformer 12, the LNT 13, the lean-NOx catalyst 15, or the ammonia-SCR catalyst 14 is integrated as a coating or within the structure of the DPF 16.

The DPF 16 is regenerated to remove accumulated soot. The DPF 16 can be of the type that is regenerated continuously or intermittently. For intermittent regeneration, the DPF 16 is heated, using a reformer 12 for example. The DPF 16 is heated to a temperature at which accumulated soot combusts with $O_2$. This temperature can be lowered by providing the DPF 16 with a suitable catalyst. After the DPF 16 is heated, soot is combusted in an oxygen rich environment.

For continuous regeneration, the DPF 16 may be provided with a catalyst that promotes combustion of soot by both $NO_2$ and $O_2$. Examples of catalysts that promote the oxidation of soot by both $NO_2$ and $O_2$ include oxides of Ce, Zr, La, Y, and Nd. To completely eliminate the need for intermittent regeneration, it may be necessary to provide an additional oxidation catalyst to promote the oxidation of NO to $NO_2$ and thereby provide sufficient $NO_2$ to combust soot as quickly as it accumulates. Where regeneration is continuous, the DPF 16 is suitably placed upstream of the reformer 12. Where the DPF 16 is not continuously regenerated, it is generally positioned as illustrated downstream of the reformer 12. An advantage of the position illustrated in FIG. 2 is that the DPF 16 buffers the temperature between the reformer 12 and the LNT 13.

The clean-up catalyst 17 is preferably functional to oxidize unburned hydrocarbons from the engine 9, unused reductants, and any $H_2S$ released from the NOx absorber-catalyst 13 and not oxidized by the ammonia-SCR catalyst 15. Any suitable oxidation catalyst can be used. A typical oxidation catalyst is a precious metal, such as platinum. To allow the clean-up catalyst 17 to function under rich conditions, the catalyst may include an oxygen-storing component, such as ceria. Removal of $H_2S$, where required, may be facilitated by one or more additional components such as NiO, $Fe_2O_3$, $MnO_2$, CoO, and $CrO_2$.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, aspect, embodiment, or example described herein.

The invention claimed is:

1. A method of operating a power generation system, comprising:
   operating a compression ignition diesel engine to produce a lean exhaust;
   channeling the exhaust through a fuel reformer and a lean $NO_X$ trap, in that order;
   from time-to-time, heating the fuel reformer to an operating temperature range and the lean $NO_X$ trap to a desulfating temperature range; and
   maintaining the lean $NO_X$ trap within the desulfating temperature range while desulfating the lean $NO_X$ trap by controlling a fuel injection into the lean exhaust upstream from the fuel reformer to be intermittent, creating alternating lean and rich phases within the fuel reformer and the lean $NO_X$ trap, in a manner that causes fuel, or reformed fuel from the rich phases to react with oxygen from the lean phases within the lean $NO_X$ trap to an extent that contributes to maintaining the lean $NO_X$ trap within the desulfating temperature range, causes the lean $NO_X$ trap to reach temperatures exceeding those reached by the fuel reformer, and enables the lean $NO_X$ trap to reach a peak temperature that is at least 50° C. above the peak temperature of the exhaust entering the lean $NO_X$ trap;
   wherein during the rich phases, the fuel reformer consumes the majority of the oxygen in the exhaust while producing reformate; and
   the lean $NO_X$ trap is a device that adsorbs $NO_X$ under lean conditions and reduces and releases adsorbed $NO_X$ under rich conditions.

2. The method of claim 1, wherein controlling the fuel injection to maintain the lean $NO_X$ trap within the desulfating temperature range comprises controlling the periods and durations of the lean and rich phases.

3. The method of claim 1, further comprising controlling the fuel reformer temperature by controlling the fuel injection.

4. The method of claim 3, wherein the fuel injection control controls the temperature of the fuel reformer independently from the temperature of the lean $NO_X$ trap.

5. The method of claim 1, wherein the reactions within the lean $NO_X$ trap cause the lean $NO_X$ trap to reach a peak temperature that is at least 100° C. above the peak temperature of the exhaust entering the lean NOX trap.

6. The method of claim 1, wherein the rich conditions are not produced unless the fuel reformer is within its operating temperature range, which is a range above 450° C.

7. The method of claim 6, further comprising following lean phases in which the fuel reformer cools below its operating temperature range, injecting fuel into the exhaust to create combustion within the fuel reformer under lean conditions to heat the fuel reformer to within its operating temperature range.

8. A power generation system comprising:
an engine;
a fuel reformer;
a lean $NO_X$ trap; and
a controller;
wherein the controller is programmed to operate according to the method of claim 1.

9. A vehicle comprising the power generation system of claim 8.

* * * * *